United States Patent
Agar

[15] 3,672,220
[45] June 27, 1972

[54] FORCE-TRANSDUCERS

[72] Inventor: Joram Agar, Farnborough, England

[73] Assignee: The Solartron Electronic Group Limited, Farnborough, England

[22] Filed: Feb. 12, 1970

[21] Appl. No.: 14,877

Related U.S. Application Data

[62] Division of Ser. No. 637,471, May 10, 1967, Pat. No. 3,529,470.

[52] U.S. Cl. .................................. 73/398 R, 73/407 R
[51] Int. Cl. ....................................... G01l 13/06
[58] Field of Search ............. 73/517 AV, 133, DIG. 1, 407 R, 73/398 R, 141 A

[56] References Cited

UNITED STATES PATENTS

| | | | |
|---|---|---|---|
| 3,067,615 | 12/1962 | Holmes | 73/398 R |
| 3,238,789 | 3/1966 | Erdley | 73/517 R |
| 3,240,065 | 3/1966 | Taber | 73/407 R |
| 3,242,738 | 3/1966 | Bellier | 73/393 |
| 3,245,264 | 4/1966 | Kaplan et al. | 73/407 R X |

*Primary Examiner*—Charles A. Ruehl
*Attorney*—William R. Sherman, Jerry M. Presson and Stewart F. Moore

[57] ABSTRACT

Force-measuring apparatus having a composite strut with two bars which are to be maintained in transverse vibration at a common resonance frequency by electrical feedback, the frequency of vibration indicating the force applied to the composite strut.

3 Claims, 10 Drawing Figures

INVENTOR
Joram Agar

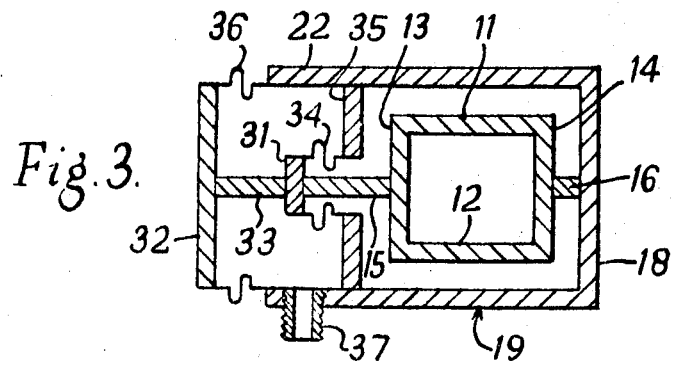
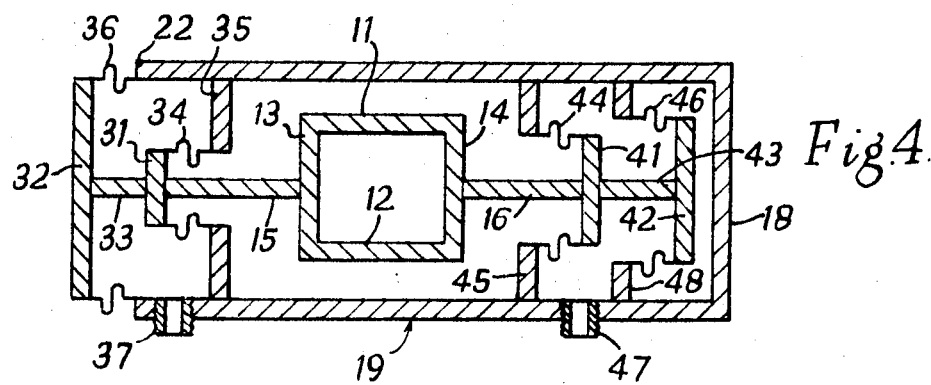
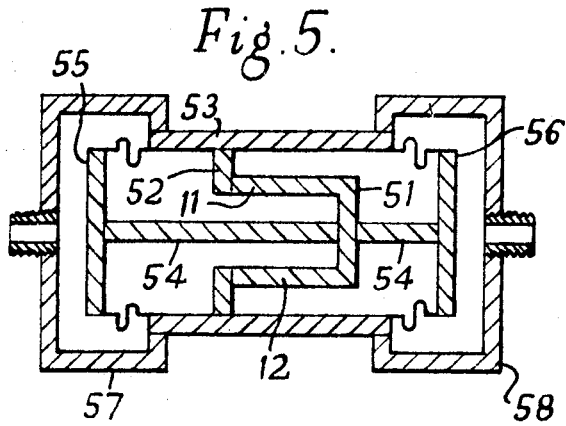
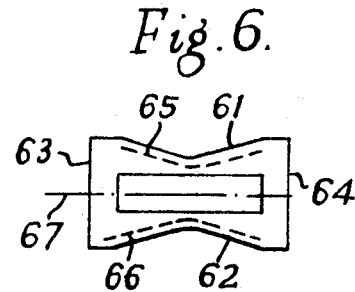
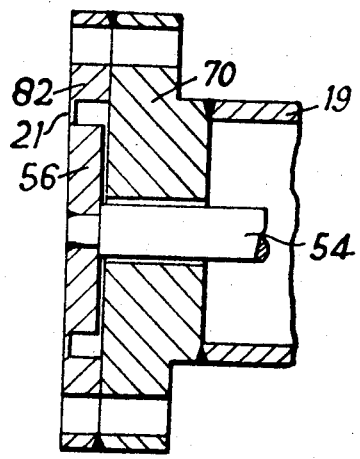

FORCE-TRANSDUCERS

This is a division of application Ser. No. 637,471, filed May 10, 1967, now U.S. Pat. No. 3,529,470, issued on Sept. 22, 1970.

This invention relates to force-measuring apparatus.

Force-measuring apparatus in which the distortion of a ring of resilient material is employed to alter the value of a passive characteristic of an electric component, for example a capacitor, is known. Such apparatus is described in U.S. Pat. No. 3,142,981. Swiss Pat. No. 390,576 discloses the use of the deflection of resilient beam by a force to alter the value of a passive characteristic of an electric component in force-measuring apparatus.

According to the present invention force-measuring apparatus includes a composite strut-member embodying two end portions coupled to one another by each of a plurality of resilient struts which are angularly disposed regularly about an axis, means for exciting transverse vibrations of the struts substantially at a common resonance frequency, and means for providing a signal representative of the frequency of the said vibrations.

Figure 1:
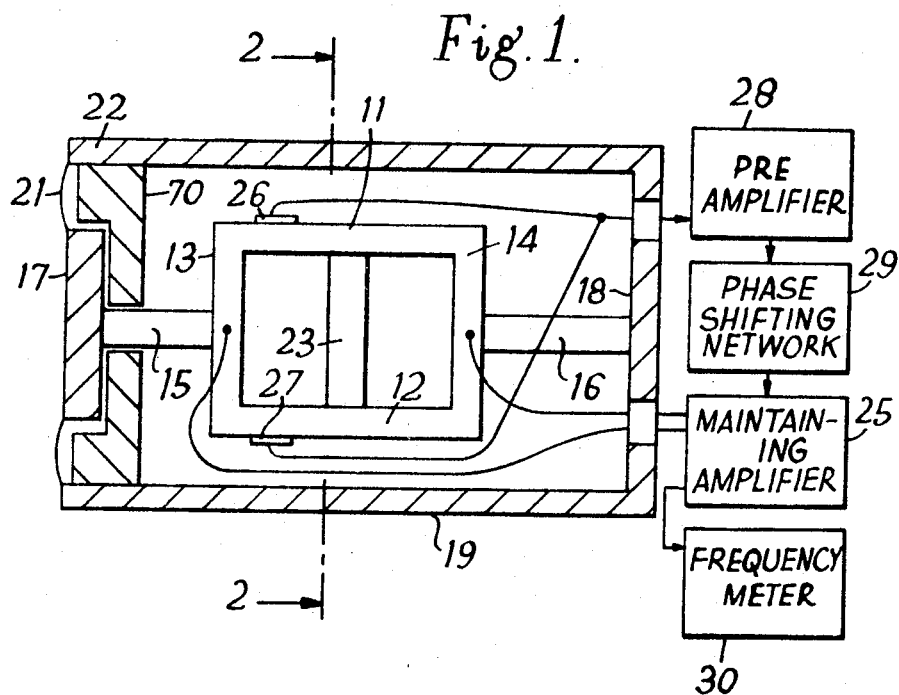
Figure 2:
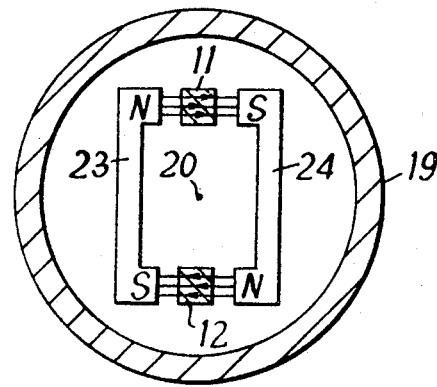
Figure 7:
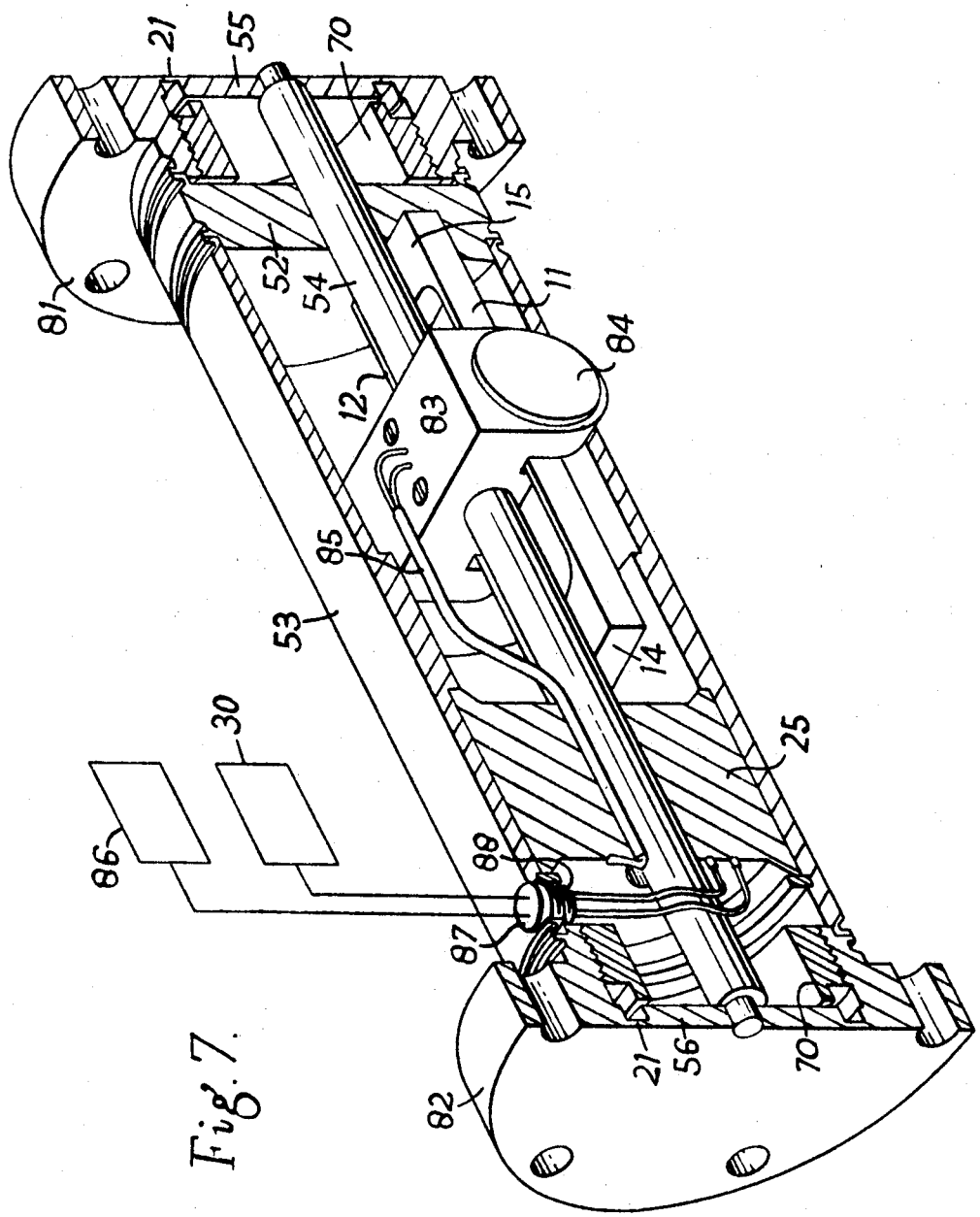
Figure 9:
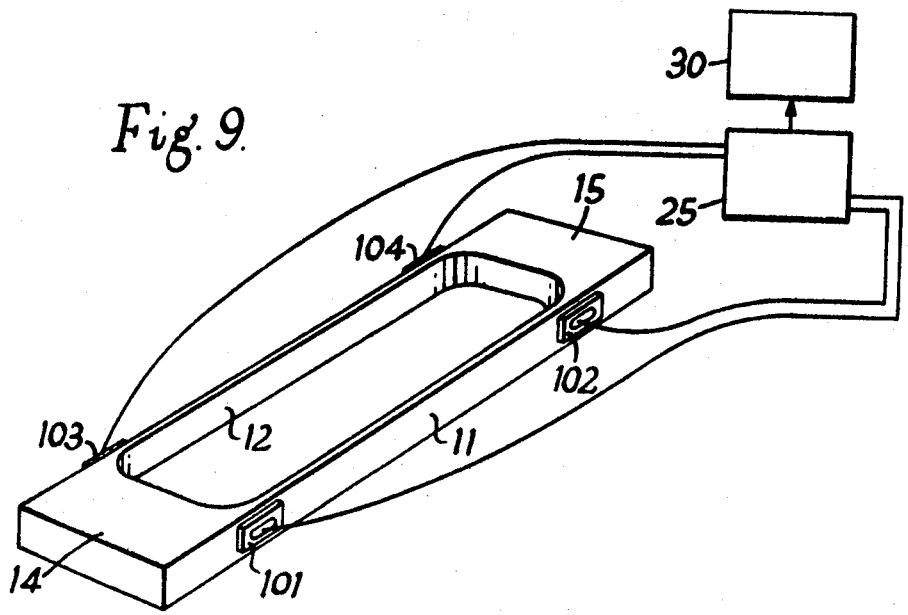
Figure 10:
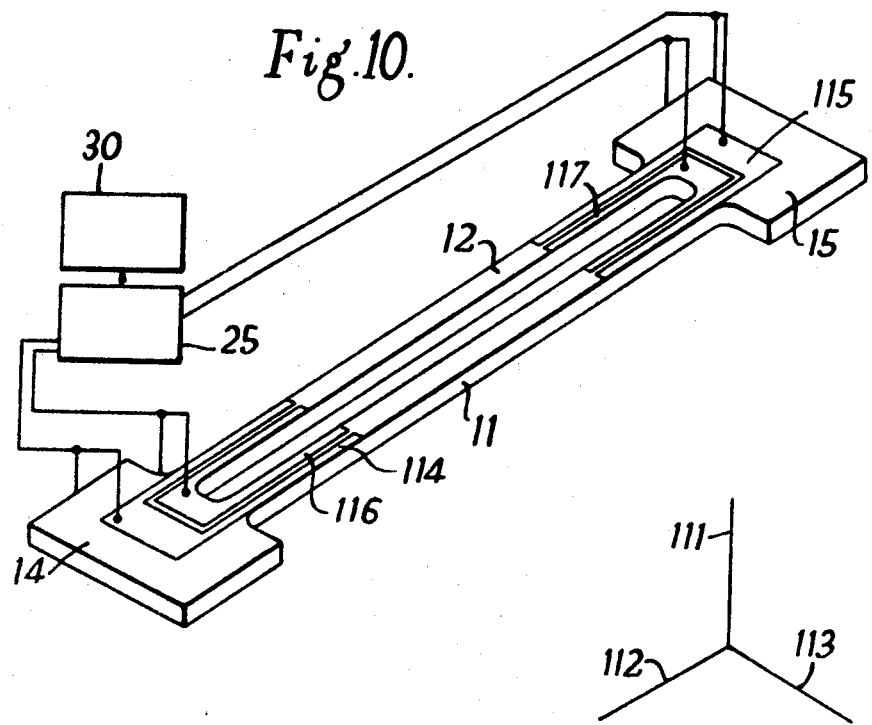

The invention will now be described by way of example with reference to the accompanying drawings in which:

FIG. 1 is a simplified sectional view of a first embodiment of the invention,

FIG. 2 is a cross-sectional view of the first embodiment taken in the line 2—2 in FIG. 1, FIG. 3 is a simplified sectional view of a second embodiment of the invention, FIG. 4 is a simplified sectional view of a third embodiment of the invention, FIG. 5 is a simplified sectional view of a fourth embodiment of the invention, FIG. 6 shows part of another embodiment of the invention, FIG. 7 is a perspective view showing in longitudinal section a modification of the embodiment shown in FIG. 5, FIG. 8 is a sectional view of an alternative feature of the embodiment of FIG. 8, FIG. 9 illustrates a strut of an embodiment employing piezo-electric means for maintaining transverse vibrations, and FIG. 10 illustrates a strut of a further embodiment employing piezo-electric means for maintaining transverse vibrations.

Corresponding respective parts of the embodiments shown are given the same reference numerals.

Referring to FIG. 1, there is shown force-measuring apparatus including a composite strut-member comprising two substantially identical bars 11 and 12 formed integrally with two connecting end pieces 13 and 14 which serve to couple the bars 11 and 12 to two aligned rods 15 and 16 and effectively to clamp the ends of the bars 11 and 12. Alternatively the two bars can be formed separately and rigidly secured to the two end pieces. The rod 15 and a disc 17 which are rigidly secured to one another comprise a first force-transmitting member. The second force-transmitting member comprises the rod 16 and an end wall 18 of a cylindrical rigid container 19 to which the rod 16 is rigidly secured.

The disc 17 and the rods 15 and 16 are coaxial with the cylindrical container 19, the bars 11 and 12 being parallel to the axis 20 of the container 19 and equally displaced therefrom, as can be seen in FIG. 2. Thus, in operation, forces can be so applied to the bars 11 and 12 through the force-transmitting members as to act upon the bars 11 and 12 equally in compression or equally in tension. Also, the bars 11 and 12 are angularly disposed regularly about the axis 20.

A fluid-tight flexible annulus 21 is secured to the disc 17 and to the rim 22 of the container 19, thereby completing a fluid-tight enclosure formed by the container 19, the disc 17 and the annulus 21, which is filled with a gas providing a reference pressure or is evacuated. Alternatively the disc and the annulus can be integrally formed.

In operation the container 19 is so secured in the wall of a chamber, not shown, in which a fluid is contained that the pressure of the fluid is applied over the outer surfaces of the disc 17 and the annulus 21. A difference between the pressure of the fluid and the reference pressure causes forces to be applied equally to the bars 11 and 12.

The bars 11 and 12 are of non-ferromagnetic metal and are connected in parallel across the output connections of a maintaining amplifier 25. A pair of permanent bar magnets 23 and 24 are so mounted within the container 19 as to apply steady magnetic fields transversely through the central regions of the bars 11 and 12, the magnetic field passing through the bar 11 being parallel but oppositely directed to the magnetic field passing through the bar 12, and both magnetic fields being perpendicular to the plane containing the longitudinal axes of the bars 11 and 12. Strain gauges 26 and 27 are attached to the bars 11 and 12 respectively to sense transverse vibration of the bars 11 and 12 in a common plane and are coupled to the input connections of a preamplifier 28 which is coupled to the input connections of the maintaining amplifier 25 through a phase-shifting network 29.

In operation, the bars 11 and 12 are maintained in transverse vibration at a common resonance frequency by feedback through the amplifiers 25 and 28 and the phase-shifting network 29. Electric currents from the maintaining amplifier 25 which pass through the bars 11 and 12 are alternating currents which are of the same frequency as the transverse vibration of the bars 11 and 12 and pass through their instantaneous zero magnitudes as the bars pass through their unloaded resting positions. Since the magnetic fields are oppositely directed, the bars 11 and 12 vibrate in phase, relative to the axis 20, corresponding points along the lengths of the bars moving in opposite directions relative to one another, except at nodes.

The bonding of the bars 11 and 12 is sensed by the strain gauges which in response generate a signal which is amplified by the preamplifier 28. The signal from the strain gauges is employed to modulate the current flowing through the bars 11 and 12 both in amplitude and direction. Since this signal reaches its peak value when the bars 11 and 12 are most bent, the phase-shifting network 29 is provided to couple the preamplifier 28 to the maintaining amplifier 25 and so shifts the phase of the signal from the strain gauges that the electric current flowing through the bars 11 and 12 is at its peak value when the bars are straight. Thus a substantially sinusoidal electric current having the same frequency as the frequency of transverse vibration of the bars 11 and 12 but $\pi/2$ radians out of phase therewith is generated whereby transverse vibration of the bars is maintained. Filters are included in the maintaining amplifier 25 to restrict the range of frequencies propagated therein as required. The bars 11 and 12 are set into vibration either by a slight mechanical vibration or by the occurrence of electrical noise in the amplifier 25 as a result of switching on the electrical apparatus 25, 28 and 29.

The frequency of the transverse vibration of the bars 11 and 12 depends upon the forces applied thereto, and can be measured indirectly by measurement of the frequency of the alternating currents which pass, in operation, through the bars 11 and 12. A frequency meter 30 is coupled to the output circuit of the maintaining amplifier 25 to measure the frequency of the said alternating currents. A range of fluid pressures can therefore be measured by the force-transducer after calibration.

In other embodiments, the transverse vibration of two bars can be maintained by means other than that used in the first embodiment, for example, the bars can be compositely formed of piezo-electric material and maintained in transverse vibration by feedback from piezo-electric sensors, or the bars can be of ferromagnetic metal and be maintained in vibration electromagnetically by feedback from detector coils to electromagnets.

Where an embodiment is to be used to measure the pressure of dangerous fluids such as radioactive fluids, it may be advantageous to provide means for maintaining vibration which are located outside the container or casing of the transducer, for example, the means including electromagnets, the bars being of magnetic material and the casing being of non-ferromagnetic stainless steel, thereby eliminating the need for electrical seals in the casing for leads to the means for maintaining vibration. Other means for maintaining vibration by including optical and electrostatic elements can be used.

Referring to FIG. 3, a second embodiment is shown in which a first force-transmitting member comprises a rod 15 and two discs 31 and 32 to which the rod 15 is rigidly secured. The two discs 31 and 32 are rigidly secured to and spaced apart by a rod 33 coaxial therewith. First bellows 34 are attached to the disc 31 and a rigid internal annular wall 35 of a container 19. Second bellows 36 are attached to the disc 32 and the rim 22 of the container 19. An inlet 37 screw-threaded into the cylindrical wall of the container 19 allows the entry of a first fluid into a chamber bounded by the discs 31 and 32, the bellows 34 and 36, the annular wall 35 and part of the cylindrical wall of the container 19. The container 19 is, in operation, so secured in the wall of a further chamber, not shown, in which a second fluid is contained that the pressure of the second fluid is applied over the outer surface of the disc 32 and the bellows 36. The compartment formed within the container 19 between the end wall 18 and the disc 31 is evacuated.

Means for causing the two bars 11 and 12 to vibrate transversely in phase at a common resonance frequency are provided but not shown.

In operation, forces are applied equally to the bars 11 and 12 substantially as a result of a difference between the pressures of the first and second fluids acting on the disc 32. The common-mode response, that is the ratio of the response to the sum of the pressures to the response to the difference between the pressures, is substantially proportional to the ratio of the area of the disc 31 to the area of the disc 32, and can therefore be small in comparison with unity.

A third embodiment shown in FIG. 4 differs from the second embodiment in that the second force-transmitting member does not include the end wall 18 of the container 19. Instead, the second force-transmitting member comprises the rod 16 secured to two discs 41 and 42 which are rigidly secured to and spaced apart by a rod 43. The discs 41 and 42 and the rod 43 are coaxial with the cylindrical container 19. Bellows 44 are attached to the disc 41 and to a rigid internal annular wall 45 of the container 19. Further bellows 46 are attached to the disc 42 and to a further rigid internal annular wall 48 of the container 19. An inlet 47 screw-threaded into the cylindrical wall of the container 19 allows the entry of a first fluid into a chamber bounded by the discs 41 and 42, the bellows 44 and 46, and part of the container 19. The enclosure formed between the end wall 18 and the disc 42, and the compartment formed between the discs 31 and 41 are evacuated.

A second fluid can be applied to the outer surface of the disc 32, in operation, as described with reference to the second embodiment.

The common-mode response of the third embodiment can be substantially annulled by making the area over which the first fluid is applied to the disc 42 larger than the area over which it is applied to the disc 41 by an amount equal to the area over which it is applied to the disc 31.

In FIG. 5 a fourth embodiment is shown in which two elastic bars 11 and 12, provided with means for causing them to vibrate transversely in phase at a common resonance frequency (not shown), are each secured at one end by a rigid annulus 52 to a cylindrical casing 53, the annulus and the casing serving as a first force-transmitting member. The other ends of the bars 11 and 12 are formed integrally with an end piece 51 which is secured to a second force-transmitting member formed in two parts. One part of the second force-transmitting member comprises a rod 54 secured to a disc 55, and the other part of the second force-transmitting member comprises a further rod 54 secured to a further disc 56. The rods 54 and the discs 55 and 56 are coaxial.

The discs 55 and 56 are the same size, and project beyond and are connected by respective bellows to the ends of the casing 53. The disc 55 forms one wall of a first chamber 57 which, in operation, is filled with a first fluid. The disc 56 forms one wall of a second chamber 58 which, in operation, is filled with a second fluid. The compartment between the discs 55 and 56 is evacuated.

The embodiment is substantially symmetrical in any plane through the axis of the casing 53.

In operation, a difference between the pressures of the first and second fluids causes equal forces to be applied to the bars 11 and 12.

Referring again to FIG. 1, it has been found that, in operation, the centers of the end pieces 13 and 14 vibrate, moving in opposite directions, at twice the frequency of vibration of the bars 11 and 12, but with comparatively small amplitude provided that the bars 11 and 12 are sufficiently long in comparison with their separation. In order to reduce the vibration of the centers of the end pieces further the composite strut-member shown in FIG. 6 can be employed in an embodiment of the present invention.

In FIG. 6, two elastic bars 61 and 62 are formed integrally with two end pieces 63 and 64. The mid-lines 65 and 66 of the bars 61 and 62 respectively incline from their ends towards an axis 67 passing through the centers of the end pieces 63 and 64.

In other embodiments, the composite strut-member comprises a circular or elliptical ring which, in operation, undergoes flexural vibrations in its plane. First and second force-transmitting members are secured to the ring diametrically opposite one another, the positions of attachment of the force-transmitting members thereby defining the end portions of the composite strut-member and the opposite segments of the ring intermediate the positions of attachment of the force-transmitting members constituting the resilient struts which vibrate in phase at or substantially at a common resonance frequency.

It has been found that variation in the frequency of the transverse vibration of the struts of an embodiment with variation in the forces applied to the struts is useful in a range close to the point of collapse of the composite strut-member. A pre-loaded elastic structure such as a pre-loaded spring and stop can be included in a force-transmitting member to serve, in operation, as a rigid link until, for example, a predetermined compressive stress is reached and thereafter to transmit a substantially constant stress during increasing strain. Rigid stops can be provided in a force-transducer to limit collapsing movements of the composite strut-member as shown for example at 70 in FIG. 1.

Embodiments of the present invention can be used for purposes other than the measurement of fluid pressures. For example, an embodiment of the present invention can be used to measure inertial forces set up by accelerations, or field forces such as gravitational forces.

Force-measuring apparatus according to the present invention can be constructed in which the resilient struts are in the form of tubes or hollow bars. In one embodiment in which two tubes are used, the tubes are parallel to the axis of a cylindrical container and equally displaced therefrom.

Furthermore, force-measuring apparatus according to the present invention having more than two resilient struts can be constructed.

A further embodiment of the present invention includes as the composite strut-member a hollow cylinder of ferromagnetic metal in the cylindrical wall of which wide longitudinal slots of identical dimensions are formed to leave a plurality of resilient struts in the form of strips equally angularly spaced about and lying parallel to the axis of the cylinder. One end of the cylinder is closed by an end wall which serves as a first force-transmitting member. A fluid-tight annulus is secured to the end wall and to the rim of a cylindrical container housing the composite strut-member. The second force-transmitting member comprises a flange and an externally screw-threaded skirt integral therewith which are formed at the other end of the composite strut-member. The composite strut-member is screw-threadedly mounted in the housing by means of the said skirt. In operation, the pressure of a liquid filling a tank in the wall of which the container is secured acts over the outer surface of the end wall of the composite strut-member. The composite strut-member is compressed parallel to its longitudinal axis by the force due to the differential pressure acting on the end wall and the reaction to that force, the pressure within the container being a low reference pressure. Such an embodiment may be provided with an odd or an even plurality of strips. A body of thermoset synthetic resin is mounted within but spaced from the composite strut-member. A drive coil and a pick-up coil are embedded in the body of synthetic resin and are electrically coupled through an amplifier to constitute a feedback loop for maintaining transverse vibrations of each of the strips. The drive and pick-up coils are provided with respective permanently magnetic cores, the axes of the coils intersecting the axis of the composite strut-member perpendicularly and lying perpendicular to one another to minimize direct coupling. An optimum orientation of the axis of the drive coil for maintaining transverse vibrations of the strips can be found empirically. The strips in operation vibrate in phase with one another relative to the axis of the composite strut-member, that is, the mid-points of all the strips reach their respective points of maximum displacement from the axis of the composite strut-member simultaneously. In similar embodiments employing suitable different means for existing transverse vibrations of the strips, other forms of phase relationships of the vibrations of the strips may be maintained.

FIG. 7 illustrates a further embodiment of the present invention in which a composite strut-member having a pair of central strips 11 and 12 which are integral with its end pieces 14 and 15 is formed of the ferromagnetic stainless alloy Ni-Span-C 902.

Ni-Span-C 902 is an iron-nickel-chromium alloy produced by the Huntingdon Alloy Products Division of the International Nickel Company, Incorporated, of Huntingdon, W. Va., and has the following limiting chemical composition:

| | |
|---|---|
| Nickel (plus cobalt) | 41.0 to 43.50% |
| Chromium | 4.90 to 5.75% |
| Titanium | 2.20 to 2.75% |
| Aluminum | 0.30 to 0.80% |
| Carbon | 0.06 maximum % |
| Manganese | 0.08 maximum % |
| Silicon | 1.00 maximum % |
| Sulphur | 0.04 maximum % |
| Phosphorus | 0.04 maximum % |
| Iron | Remainder |

Further details of the properties of Ni-Span C 902 are given in Technical Bulletin T-31 of the Huntingdon Alloy Products Division.

The composite strut-member is so shaped that a face of strip 11 opposes a face of the strip 12, thereby affording a lower frequency of transverse vibration of the strips 11 and 12 in the common plane passing through their axes than in respective planes perpendicular to the said common plane. In one embodiment constructed as shown in FIG. 7, each strip is approximately twenty thousandths of an inch thick, one-hundred-and-forty-four thousandths of an inch deep, and 1 ½ inches long. Each end piece, and hence the composite strut-member, is approximately four-hundred-and-forty thousandths of an inch wide.

The end piece 14 is welded to the rod 54, which is of non-ferromagnetic metal, at a flat formed on the rod. A further flat formed on the rod 54 provides a clearance between the rod and the end piece 15. The end piece 15 is welded to a shoulder formed on the rigid annulus 52 through which the rod 54 passes freely. The annulus 52 is welded to one end of the non-ferromagnetic cylindrical metal casing 53. A metal end plate 81 welded to the annulus 52 embodies the flexible annulus 21 and the disc 55, a like metal end plate 82 welded to the other end of the casing 53 embodying a further flexible annulus 21 and the disc 56. The ends of the rod 54 are located by and welded to the discs 55 and 56.

In operation, the force-transmitting members, which comprise the annulus 52, and the rod 54 and the discs 55 and 56 respectively, apply forces to the composite strut-member which act along a line which is inclined at a small angle to the longitudinal axis of the composite strut-member as a result of the balancing couple provided by those components of reaction which act perpendicular to the faces of the composite strut-member.

The space within the embodiment between the end plates 81 and 82 is filled with air at atmospheric pressure, the pressure of fluid filling this space having no effect on the transmission of force to the composite strut-member. The end plates are internally screw-threadedly engaged with respective metal annular stops 70 to limit collapsing movements of the discs 55 and 56. An alternative all-welded construction of the end plates and stops is shown in FIG. 8.

The end plates 81 and 82 are provided with bolt holes to enable respective flanged pipes to be clamped to the end plates in order to bring the fluids of which the difference in pressure is to be measured into contact with the entire outer surfaces of the discs 55 and 56.

An aluminum or non-ferromagnetic stainless steel saddle 83 is mounted on the rod 54, being clamped at a selected position by means of a pair of set screws. The saddle is symmetrical with respect to the plane of section of FIG. 7 and a drive coil 84 and a pick-up coil (not shown) are located in respective apertures at opposite ends of the saddle. The position of the saddle 83 on the rod 54 is such that the axes of the drive and pick-up coils pass through the mid-points of the strips 11 and 12.

The drive coil 84 is coupled to the output circuit and the pick-up coil is coupled to the input circuit of the maintaining amplifier 25 which is encapsulated in thermoset synthetic resin and located within the casing 53 between an internal shoulder of the casing and a circlip located in an internal groove in the casing. The rod 54 and a cable 86 which connects the drive and pick-up coils to the amplifier 25 pass through an aperture in the amplifier 25. A power supply 86 and the frequency meter 30 are coupled to the amplifier 25 through a plug connector 87 which is fitted into a socket connector 88 mounted in the wall of the container 19.

In operation, the slight mechanical vibration or electrical noise occurring on energization of the amplifier 25 serves to initiate transverse vibration of the strips 11 and 12 at a common resonance frequency in the plane containing their longitudinal axes. Feedback through the amplifier 25 from the pick-up coil to the drive coil 84 then serves to maintain such vibration, the amplifier having suitable gain and phase characteristics. The strips vibrate in phase with one another relative to the longitudinal axis of the composite strut-member as a natural consequence of the form of the composite strut-member.

The frequency meter 30 is coupled to the output circuit of the amplifier 25 and measures the frequency of the alternating current flowing in the drive coil 84. The drive and pick-up coils are provided with respective biassing windings which are fed from the power supply 86 with direct current to establish steady magnetic fields. The steady field of the drive coil 84 serves to prevent the total magnetic field thereof from varying at twice the frequency of the transverse vibration of the strips 11 and 12.

In FIG. 9 there is shown a composite strut-member of the same form and material as that shown in FIG. 7 but having piezo-electric means for exciting and sensing transverse vibration of the strips 11 and 12.

Plates 101 to 104 of a piezo-electric ceramic material known as Brush Clevite FEZ 4 are bonded to the composite strut-member, the drive plates 101 and 102 being bonded to opposite ends of the strip 11 and the pick-up plates 103 and 104 being bonded to opposite ends of the strip 12. Each of the plates 101 to 104 is provided with a metal electrode, the output of the maintaining amplifier 25 being, in operation, applied between the electrodes of the drive plates 101 and 102, and the electric potential difference set up between the electrodes of the pick-up plates 103 and 104 as a result of the vibration of the strip 12 being applied as the input to the maintaining amplifiers. Transverse vibration of the strips 11 and 12 in the plane containing their longitudinal axes is maintained by feedback through the amplifier 25, which has suitable gain and phase characteristics, the frequency of the alternating voltage output of the amplifier being measured by the frequency meter 30.

A quartz composite strut-member of an embodiment of the present invention is shown in FIG. 10 cut from a quartz plate having its faces parallel to the Y-Z plane of the piezo-electric crystal axes, the directions of the X, Y and Z piezo-electric crystal axes relative to the composite strut-member being shown at 111, 112 and 113 respectively.

The upper face of the composite strut-member has plated thereon four metal electrodes 114, 115, 116 and 117. Four further electrodes, not shown, similarly shaped and arranged are plated on the under face of the composite strut-member. The electrodes 114, 116, and the corresponding electrodes on the under face of the composite strut-member are connected to the output circuit of the maintaining amplifier 25 in such a manner that the inner upper electrode 114 is connected directly to the outer lower electrode, and the outer upper electrode 116 is connected directly to the inner lower electrode. The electrodes 115, 117, and the corresponding electrodes on the under face of the composite strut-member are connected to the input circuit of the amplifier 25 in like manner. Thus, in operation, the electrodes 114, 116, and the corresponding lower electrodes serve as drive electrodes and the electrodes 115, 117, and the corresponding lower electrodes serve as pick-up electrodes. Transverse vibration of the bars 11 and 12 are maintained by feedback through the amplifier 25, which has suitable gain and phase characteristics, the frequency of the alternating output voltage of the amplifier being measured by the frequency meter 30.

For the composite strut-members shown in FIGS. 7, 9 and 10, the following equation gives the relationship between the frequency $f$ of the transverse vibration of a strip or bar of the composite strut-member and the load S applied to the strip or bar:

$$f = f_o \sqrt{1 \pm (S/S_o)}$$

where $f_o$ is a constant for a given strut, and $$S_o = (4\pi^2 E I n^2 / l^2)$$

where E is Young's modulus of elasticity of the material of the strip or bar, $I$ is the moment of cross-sectional area of the strip or bar, $l$ is the effective length of the strip or bar, and $n$ is an integer.

The value of $l$ can be determined empirically. It will be realized that $S_o$ is the Euler Buckling Load.

Although embodiments in which in operation the struts vibrate at a common resonance frequency have been described hereinbefore, other embodiments can be constructed in which the frequency at which the struts vibrate is close to a common resonance frequency. For example, vibration of the struts in an embodiment can be excited by impulse, the vibrations subsequently decaying naturally, and the frequency of the decaying vibrations being measured. The struts of such an embodiment are only lightly damped, so that the frequency of the vibrations, which is the natural frequency, is substantially at a common resonance frequency.

What is claimed is:

1. Force-measuring apparatus, including a composite strut-member and means for supporting the said composite strut-member, the composite strut-member embodying two end portions and a plurality of resilient struts, the said resilient struts being angularly disposed regularly about an axis and each said strut coupling the said end portions to one another, means for exciting transverse vibrations of the said struts substantially at a common resonance frequency, and means for providing a signal representative of the frequency of the said vibrations wherein one of the said end portions is secured to a force-transmitting member which includes two walls of a container rigidly connected to one another, and the other of said end portions is secured to a further rigid wall of the said container movably connected to the said two walls, the said composite strut-member being housed in the container between the said two walls.

2. Force-measuring apparatus, including a composite strut-member and means for supporting the said composite strut-member, the composite strut-member embodying two end portions and a plurality of resilient struts, the said resilient struts being angularly disposed regularly about an axis and each said strut coupling the said end portions to one another, means for exciting transverse vibrations of the said struts substantially at a common resonance frequency, and means for providing a signal representative of the frequency of the said vibrations wherein the said composite strut-member is housed in a fluid-tight compartment of a container, wherein one of the said end portions is secured to a force-transmitting member which includes a chamber for fluid movably connected to a rigid wall of the said container.

3. Apparatus as claimed in claim 2, wherein the other of the said end portions is secured to a further force-transmitting member which includes a further chamber for fluid movably connected to the said rigid wall of the said container.

* * * * *